(12) United States Patent
Cho

(10) Patent No.: US 10,718,859 B2
(45) Date of Patent: Jul. 21, 2020

(54) RADAR DEVICE AND RADAR DETECTION METHOD

(71) Applicant: MANDO CORPORATION, Gyeonggi-do (KR)

(72) Inventor: Hyeon Dong Cho, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 610 days.

(21) Appl. No.: 15/487,408

(22) Filed: Apr. 13, 2017

(65) Prior Publication Data

US 2017/0299708 A1 Oct. 19, 2017

(30) Foreign Application Priority Data

Apr. 19, 2016 (KR) ........................ 10-2016-0047841

(51) Int. Cl.
*G01S 13/04* (2006.01)
*G01S 13/931* (2020.01)
*H01Q 17/00* (2006.01)

(52) U.S. Cl.
CPC ............ *G01S 13/04* (2013.01); *G01S 13/931* (2013.01); *G01S 2013/9325* (2013.01); *H01Q 17/00* (2013.01)

(58) Field of Classification Search
CPC ................. G01S 13/931; H01Q 17/00–17/008
See application file for complete search history.

(56) References Cited

U.S. PATENT DOCUMENTS

| | | | | |
|---|---|---|---|---|
| 5,081,455 A * | 1/1992 | Inui | ...................... | H01Q 17/002 342/1 |
| 5,296,859 A * | 3/1994 | Naito | ..................... | H01Q 17/00 342/1 |
| 5,708,435 A * | 1/1998 | Kudo | ..................... | H01Q 17/00 342/1 |
| 6,037,046 A * | 3/2000 | Joshi | ........................ | E04B 1/92 174/386 |
| 6,043,784 A * | 3/2000 | Winter | .................. | G01S 13/931 343/753 |
| 6,441,771 B1 * | 8/2002 | Victora | ................ | H01Q 17/002 342/1 |
| 7,495,181 B2 * | 2/2009 | Matsushita | ............ | H01Q 17/00 174/377 |
| 7,804,439 B2 * | 9/2010 | Yoshida | ............... | H05K 9/0003 342/1 |
| 7,864,095 B2 * | 1/2011 | Masuda | ................... | H01Q 1/38 342/1 |
| 8,564,472 B2 * | 10/2013 | Okamura | ............... | H01Q 1/526 342/1 |
| 8,643,564 B2 * | 2/2014 | Shimayama | ............ | H01P 5/028 333/246 |
| 9,679,828 B2 * | 6/2017 | Verma | ................. | H01L 23/5227 |
| 2007/0159380 A1 * | 7/2007 | Nagaishi | ................. | G01S 7/032 342/70 |
| 2007/0241962 A1 * | 10/2007 | Shinoda | .................. | G01S 7/032 342/361 |
| 2017/0363713 A1 * | 12/2017 | Kim | ........................ | G01S 7/024 |

\* cited by examiner

*Primary Examiner* — Peter M Bythrow
(74) *Attorney, Agent, or Firm* — Ladas & Parry, LLP

(57) ABSTRACT

Embodiments disclosed herein relates to a radar device, and more particularly, to a radar device having a structure that reduces the influence of an internal reflected wave, which is capable of preventing a target sensing performance from being deteriorated by a reflected wave reflected within the radar device, while having a cover structure that is capable of protecting an antenna from the outside.

15 Claims, 17 Drawing Sheets

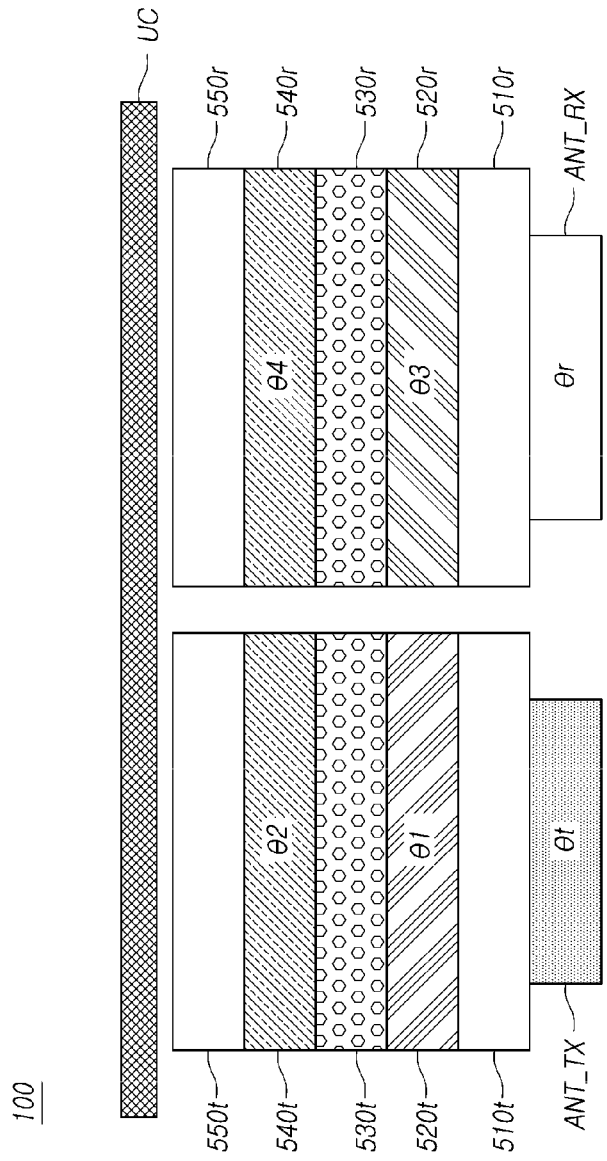

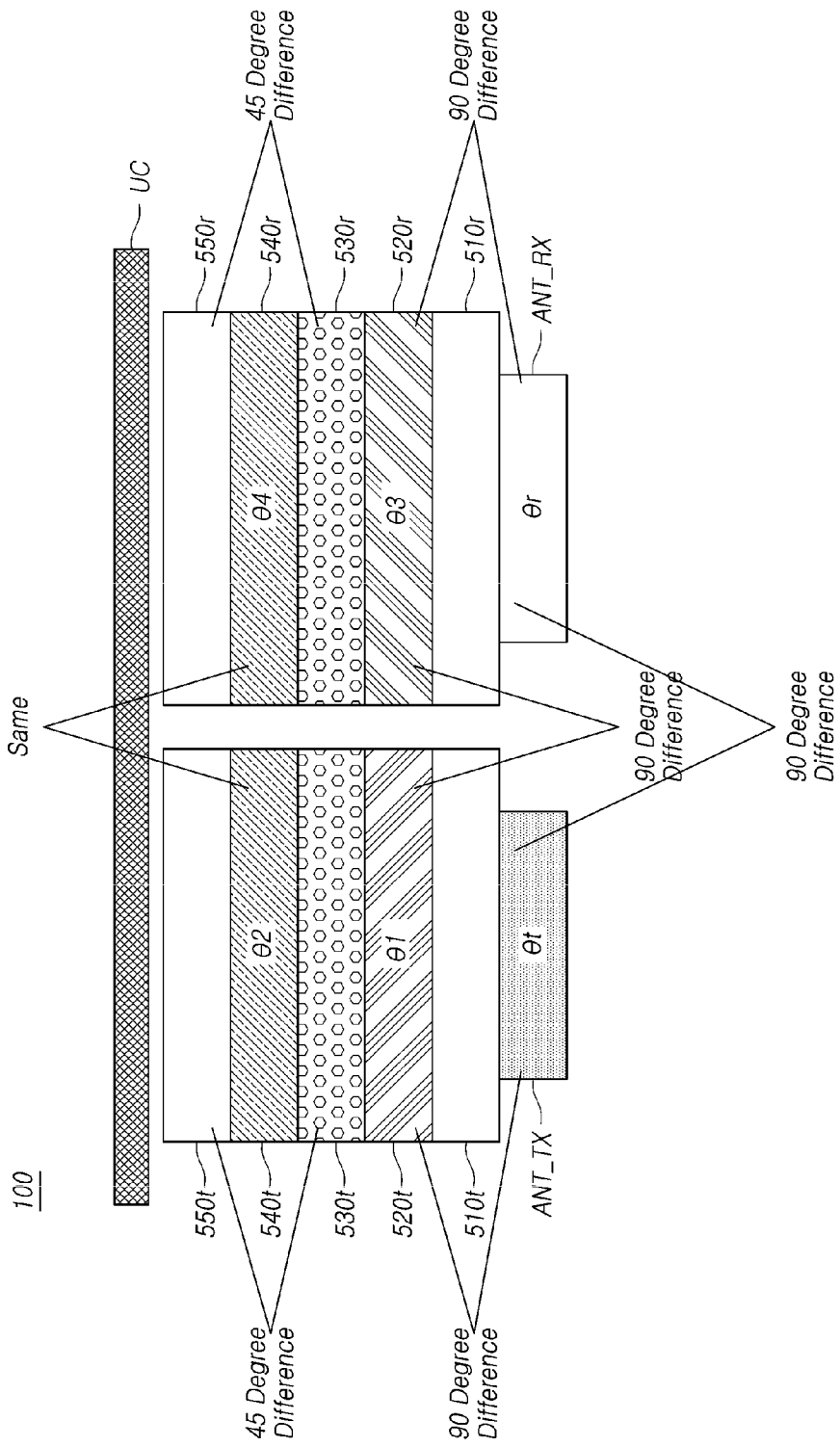

RADAR DEVICE AND RADAR DETECTION METHOD

CROSS REFERENCE TO RELATED APPLICATION

This application claims priority from Korean Patent Application No. 10-2016-0047841, filed on Apr. 19, 2016, which is hereby incorporated by reference for all purposes as if fully set forth herein.

BACKGROUND OF THE INVENTION

1. Field of the invention

Embodiments disclosed herein relate to a radar device and a radar detection method.

2. Description of the Prior Art

A radar device is a sensor for detecting a target therearound, and is widely used in various fields, including civilian and military fields.

Such a radar device is mounted on a vehicle, an aircraft, and the like, and is being used by being fused with various application technologies.

For example, when a radar device is equipped in a vehicle, the radar device senses a peripheral obstacle, such as a vehicle or a pedestrian in front of the vehicle equipped with the radar device, and a control system of the vehicle equipped with the radar device may perform control by using the detection result of the radar device so as to allow the vehicle to avoid the obstacle. In another example, a radar device equipped in a vehicle may sense a vehicle preceding the vehicle, and an in-vehicle control system may use the detection result of the radar device to perform control so as to cause the vehicle to follow the preceding vehicle.

In order to ensure that the radar device to perform accurate sensing of a target, a normal transmission signal must be radiated from the radar device, and a reflected wave which is the radiated wave reflected from the target must normally reach a reception antenna.

However, when an antenna (a transmission antenna or a reception antenna) included in the radar device is flawed or contaminated with dust or dirt, an abnormal antenna shape or beam pattern may be caused.

As a result, a normal transmission signal is not radiated from the radar device, or a reflected wave, which is reflected from the target, of the radiated transmission signal does not reach the reception antenna normally, so that target sensing performance may be significantly deteriorated.

SUMMARY OF THE INVENTION

An object of the embodiments is to provide a laser device having a cover structure that is capable of protecting an antenna from the outside.

Further, another object of the embodiments is provide a radar device having a structure that reduces the influence of an internal reflected wave, which is capable of preventing a target sensing performance from being deteriorated by a reflected wave reflected within the radar device, while having a cover structure that is capable of protecting an antenna from the outside.

In one aspect, the embodiments may provide a radar device including: at least one transmission antenna configured to output a transmission polarization signal having a predetermined transmission polarization angle; at least one reception antenna configured to receive a reception polarization signal having a predetermined reception polarization angle; and a lower housing and an upper cover configured to accommodate the at least one transmission antenna and the at least one reception antenna.

In the radar device, between the transmission antenna and the upper cover, a first transmission-side dielectric, the first transmission-side strip conductor, the transmission-side ferromagnetic material, the second transmission-side strip conductor, and a second transmission-side dielectric may be stacked in that order.

In the radar device, between the reception antenna and the upper cover, a first reception-side dielectric, the first reception-side strip conductor, the reception-side ferromagnetic material, the second reception-side strip conductor, and a second reception-side dielectric may be stacked in that order.

In the radar device, the transmission polarization angle of the transmission antenna and the reception polarization angle of the reception antenna may be different from each other by 90 degrees.

In another aspect, the embodiments may provide a radar device including: at least one transmission antenna configured to output a transmission polarization signal having a predetermined transmission polarization angle; at least one reception antenna configured to receive a reception polarization signal having a predetermined reception polarization angle; and a lower housing and an upper cover configured to accommodate the at least one transmission antenna and the at least one reception antenna.

In the radar device, between the at least one transmission antenna and the upper cover, a transmission-side ferromagnetic material may exist, and a first transmission-side strip conductor positioned above the transmission-side ferromagnetic material and/or a second transmission-side strip conductor positioned below the transmission-side ferromagnetic material may further exist.

Between the at least one reception antenna and the upper cover, a reception-side ferromagnetic material may exist, and a first reception-side strip conductor positioned above the reception-side ferromagnetic material and/or a second reception-side strip conductor positioned below the reception-side ferromagnetic material may further exist.

In a still another aspect, the embodiments may provide a radar detection method including: transmitting a transmission polarization signal having a predetermined transmission polarization angle so that at least one transmission antenna detects an object; and radiating the transmission polarization signal to an outside via a transmission-side strip conductor and a transmission-side ferromagnetic material and through an upper cover.

In the radar detection method, a polarization angle of the signal radiated to the outside through the upper cover may be different from a transmission polarization angle of the transmission polarization signal transmitted from the transmission antenna.

The above-mentioned radar detection method may further include: causing an external signal to enter an inside through the upper cover; and receiving, by the at least one reception antenna, the signal that enters the inside through the upper cover.

The polarization angle of the signal that enters the inside through the upper cover may be different from the reception polarization angle of the reception polarization signal, which is a signal that reaches the at least one reception antenna.

In still another aspect, the embodiments may provide a radar device including: at least one transmission antenna configured to output a transmission polarization signal having a predetermined transmission polarization angle; at least one reception antenna configured to receive a reception polarization signal having a predetermined reception polarization angle; and a lower housing and an upper cover configured to accommodate the at least one transmission antenna and the at least one reception antenna.

The radar device may further include: a transmission-side strip conductor and a transmission-side ferromagnetic material positioned between the at least one transmission antenna and the upper cover.

In addition, the radar device may further include: a reception-side strip conductor and a reception-side ferromagnetic material positioned between the at least one reception antenna and the upper cover.

In the radar device, the transmission polarization angle of the at least one transmission antenna and the polarization angle of the transmission-side strip conductor may be different from each other by 90 degrees.

The reception polarization angle of the at least one reception antenna and the polarization angle of the reception-side strip conductor may be different from each other by 45 degrees or 90 degrees.

The polarization angle of the transmission-side strip conductor and the polarization angle of the reception-side strip conductor may be different from each other by 45 degrees or 90 degrees.

The transmission-side ferromagnetic material and the reception-side ferromagnetic material may have a thickness of $\lambda/4$.

The at least one transmission antenna, the transmission-side strip conductor, the transmission-side ferromagnetic material, and the upper cover may be disposed in that order, or they may be disposed in the order of the at least one transmission antenna, the transmission-side ferromagnetic material, the transmission-side strip conductor, and the upper cover.

The at least one reception antenna, the reception-side strip conductor, the reception-side ferromagnetic material, and the upper cover may be disposed in that order, or they may be disposed in the order of the at least one reception antenna, the reception-side ferromagnetic material, the reception-side strip conductor, and the upper cover.

A signal reflected from the upper cover may not pass through the transmission-side strip conductor or the reception-side strip conductor, and a signal reflected from the lower housing may not pass through the reception-side strip conductor or the transmission-side strip conductor.

In another aspect, the embodiments may provide a radar device including: at least one transmission antenna configured to output a transmission polarization signal having a predetermined transmission polarization angle; at least one reception antenna configured to receive a reception polarization signal having a predetermined reception polarization angle; and an upper cover disposed above the transmission antenna and the reception antenna.

In the radar device, the transmission polarization angle of the transmission antenna and the reception polarization angle of the reception antenna may be different from each other by 90 degrees.

In still another aspect, the embodiments may provide a radar device including at least one transmission antenna configured to transmit a transmission polarization signal and an upper cover positioned above the transmission antenna.

In the radar device, the polarization angle of a signal radiated to the outside of the radar device through the upper cover may be different from the transmission polarization angle of the transmission polarization signal transmitted from the transmission antenna.

In yet another aspect, the embodiments may provide a radar device including: at least one transmission antenna configured to output a transmission polarization signal; at least one reception antenna configured to receive a reception polarization signal; and an upper cover disposed above the transmission antenna and the reception antenna.

In the radar device, the polarization angle of a signal, which enters the inside of the radar device through the upper cover, may be different from the reception polarization angle of the reception polarization signal, which has reached the reception antenna.

According to the above-described embodiments, it is possible to provide a laser device having a cover structure that is capable of protecting an antenna from the outside.

According to the embodiments it is possible to provide a radar device having a structure of reducing the influence of an internal reflected wave, which is capable of preventing a target sensing performance from being deteriorated by a reflected wave reflected within the radar device, while having a cover structure that is capable of protecting an antenna from the outside.

BRIEF DESCRIPTION OF THE DRAWINGS

The above and other objects, features, and advantages of the present invention will be more apparent from the following detailed description taken in conjunction with the accompanying drawings, in which:

FIG. 5 is a view illustrating a radar device according to a second embodiment;

FIG. 6 is a view illustrating structural features of the radar device according to the second embodiment;

DETAILED DESCRIPTION OF THE EXEMPLARY EMBODIMENTS

Figure 1:
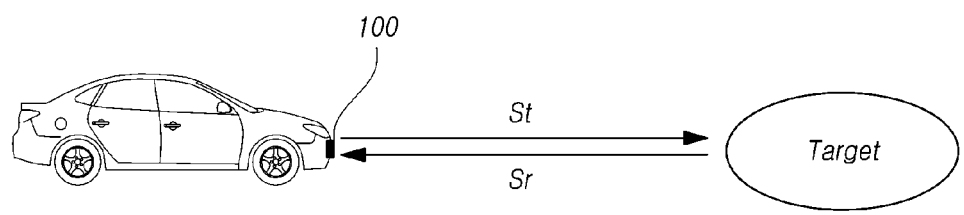
FIG. 1 is a view illustrating an aspect in which a radar device according to embodiments disclosed herein is equipped in a vehicle.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a view illustrating an aspect in which a radar device 100 according to the embodiments is equipped in a vehicle.

Referring to FIG. 1, the radar device 100 according to the embodiments may be equipped in a vehicle or the like to sense whether or not a target exists in front of the radar device 100, to sense the position of the target, or to sense a distance to the target.

The radar device 100 may be equipped at any position on the front, rear, and lateral sides of various transportation means (e.g., an automobile, a train, an electric train, and an airplane) as well as a vehicle.

The target to be sensed by the radar device 100 may be any object (e.g., a vehicle, a person, or an object) existing around the radar device 100, or may be a specific object.

The radar device 100 radiates a transmission signal St in the form of an electromagnetic wave and receives a reception signal Sr which corresponds to the radiated transmission signal St returned after hitting the target, and may sense whether or not the target exists, the distance to the target, or the position of the target based on the received reception signal Sr.

Hereinafter, a process, in which the radar device 100 senses whether or not a target exists, the position of the target, or a distance between the radar device 100 and the target, will be referred to as a target sensing process.

The target sensing process may include signal detection processing for a reception signal Sr, signal processing for the detected reception signal Sr, signal analysis processing, and the like.

The radar device 100 according to the embodiments may include at least one transmission antenna for radiating a transmission signal St and at least one reception antenna for receiving a reception signal Sr.

Here, the transmission antenna and the reception antenna may be designed in various antenna structures, antenna shapes, and the like. For example, the transmission antennas and the reception antennas may be designed in the form of an array antenna that is composed of a plurality of antenna elements, or may be designed in the form of a microstrip antenna or a patch antenna.

Figure 2:
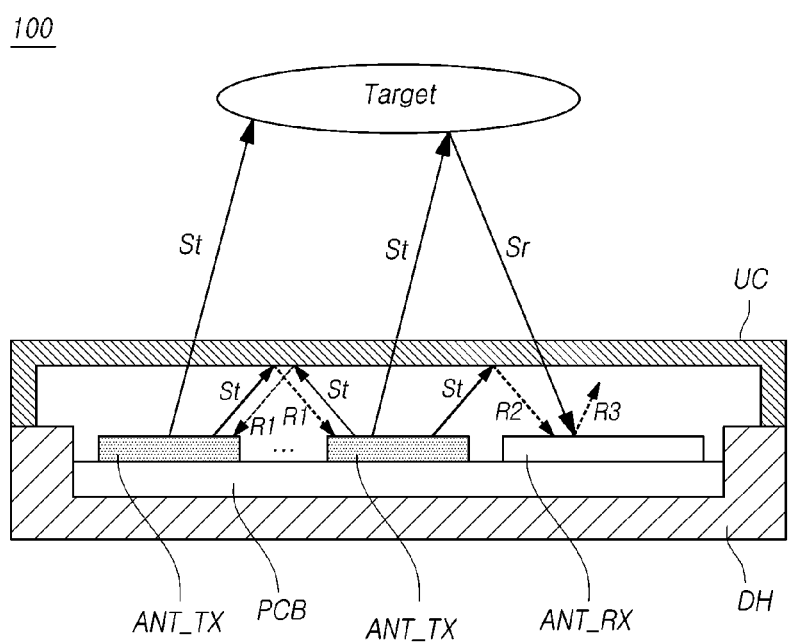
FIG. 2 is a view illustrating a radar device according to a first embodiment.

FIG. 2 is a view illustrating a radar device 100 according to a first embodiment.

Referring to FIG. 2, the radar device 100 according to the first embodiment includes at least one transmission antenna ANT_TX, at least one reception antenna ANT_RX, a lower housing DH and an upper cover UC that accommodate the transmission antenna ANT_TX and the reception antenna ANT_RX, and the like.

The transmission antenna ANT_TX and the reception antenna ANT_RX may be mounted on a printed circuit board (PCB) that is accommodated in the lower housing DH.

The upper cover UC is capable of preventing the transmission antenna ANT_TX and the reception antenna ANT_RX from being damaged, or preventing dirt, dust, or the like from being attached to the transmission antenna ANT_TX and the reception antenna ANT_RX.

Accordingly, the upper cover UC is capable of preventing the antenna from taking on an abnormal shape or generating an abnormal beam pattern, thereby maintaining antenna performance. Such an upper cover UC is also referred to as a "radome."

As described above, the upper cover UC shall serve to protect the transmission antenna ANT_TX, and the reception antenna ANT_RX from the outside. However, the upper cover UC shall not be an obstacle to the transmission of a transmission signal St, which is transmitted from the transmission antenna ANT_TX, to the outside, or an obstacle to the normal delivery of a reception signal Sr, which enters from the outside, to the reception antenna ANT_RX.

For example, the upper cover UC shall transmit a transmission signal St, which is transmitted from the transmission antenna ANT_TX, therethrough. However, the upper cover UC shall not block the radiation of the transmission signal St to the outside by reflecting the transmission signal St from the inner surface thereof.

In addition, the upper cover UC shall transmit a reception signal Sr, which enters from the outside, therethrough so that the reception signal Sr can be transmitted well to the reception antenna ANT_RX. However, the upper cover UC shall not hinder the reception signal Sr, which enters from the outside, from being transmitted to the reception antenna ANT_RX by reflecting the reception signal Sr from the outer surface thereof.

In addition, the upper cover UC shall not allow a signal, which is reflected from the transmission antenna ANT_TX and the reception antenna ANT_RX, to be transmitted to the outside.

The radar device 100 according to the first embodiment illustrated in FIG. 2 further includes the upper cover UC so as to protect the transmission antenna ANT_TX and the reception antenna ANT_RX from the outside, so that target detection performance can be improved in view of preventing antenna damage.

However, due to the upper cover UC provided in view of preventing antenna damage, a side effect may be caused in that the upper cover UC may be an obstacle to the transmission of a transmission signal St, which is transmitted from the transmission antenna ANT_TX, to the outside, or an obstacle to the normal delivery of a reception signal Sr, which enters from the outside, to the reception antenna ANT_RX.

For example, referring to FIG. 2, a transmission signal St transmitted from the transmission antenna ANT_TX may be reflected from the inner surface of the upper cover UC, so that a signal R1 directed toward the transmission antenna ANT_TX from the upper cover UC may be transmitted to the transmission antenna ANT_TX.

Accordingly, the transmission signal St may not be normally transmitted to the outside of the radar device 100, and as a result target sensing performance may be degraded.

In addition, referring to FIG. 2, a transmission signal St transmitted from the transmission antenna ANT_TX may be reflected from the inner surface of the upper cover UC, so that a signal R2 directed toward the reception antenna ANT_RX from the upper cover UC may be transmitted to the reception antenna ANT_RX.

Accordingly, the reception antenna ANT_RX may receive the signal R2 reflected from the inside of the radar device 100, rather than the reception signal Sr reflected from the target, so that a target detection error may be caused.

In addition, referring to FIG. 2, the reception signal Sr reflected from the target enters the inside of the radar device 100 and is reflected from the reception antenna ANT_RX so that a signal R3 directed toward the upper cover UC from the reception antenna ANT_RX may be transmitted through the upper cover UC.

In this case, when the reception signal Sr reflected by the target enters the inside of the radar device 100 to be reflected again, thereby being radiated to the outside, the reception antenna ANT_RX may again receive an erroneous reception signal Sr, so that a target detection error may be caused.

Hereinbelow, descriptions will be made on embodiments of a radar device 100 having a structure capable of reducing a side effect that may be caused by an upper cover UC provided in terms of preventing antenna damage.

First, two configurations (a strip conductor and a ferromagnetic material) used together for the internal reflection reduction of a radar device 100 will be described.

Figure 3:
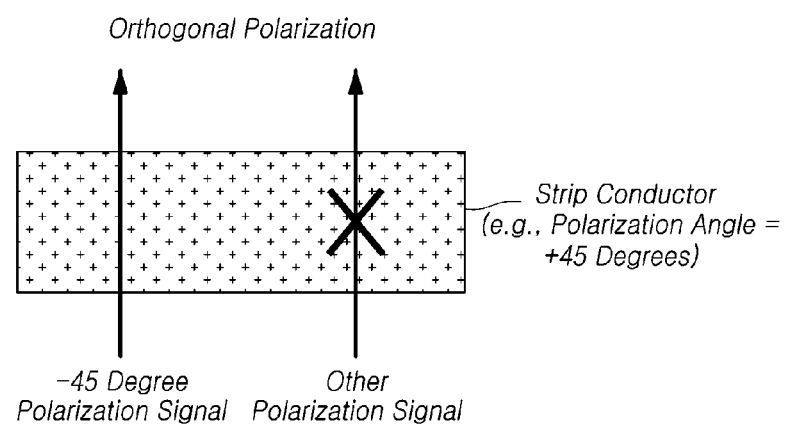
FIGS. 3 and 4 are views for explaining two configurations (a strip conductor and a ferromagnetic material) used together for the internal reflection reduction of a radar device.
Figure 4:
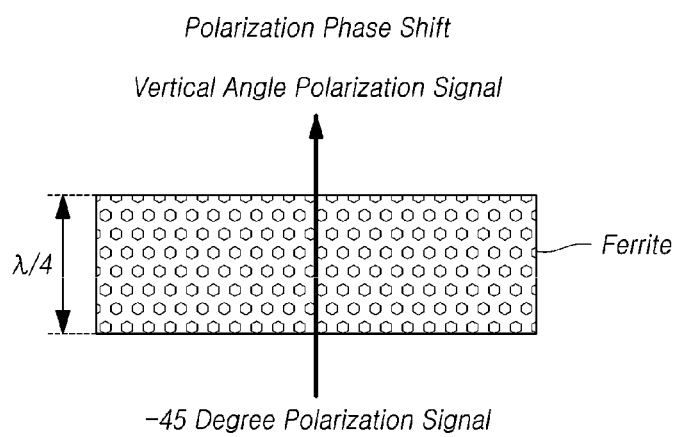

FIGS. 3 and 4 are views for explaining two configurations (a strip conductor and a ferromagnetic material) used together for reducing the internal reflection of a radar device 100.

Referring to FIG. 3, a strip conductor used in the radar device 100 according to the embodiments may have a predetermined polarization characteristic.

The strip conductor transmits only a signal having a difference of 90 degrees from a polarization angle corresponding to its own polarization characteristic.

Therefore, a signal, which does not have a difference of 90 degrees from the polarization angle corresponding to the polarization characteristic of the strip conductor may be lost or fade by hitting the strip conductor and not being transmitted through the strip conductor.

That is, only a signal having a deviation difference of 90 degrees from the polarization angle corresponding to the polarization characteristic of the strip conductor can be normally transmitted through the strip conductor.

This phenomenon is attributed to the "orthogonal polarization principle" in which signals having a 90 degree polarization difference do not affect each other. Here, orthogonal polarization means that vertical polarization and horizontal polarization are orthogonal to each other.

The strip conductor illustrated in FIG. 3 has, for example, a polarization characteristic corresponding to a polarization angle of +45 degrees.

Therefore, due to the orthogonal polarization principle, a −45 degree polarization signal (which is the same as a +135 degree deviation signal) has a deviation difference of +45 degrees or +90 degrees, which is a polarization angle corresponding to the polarization characteristic of the strip conductor, and as a result, the −45 degree polarization signal can be normally transmitted through the strip conductor.

However, a polarization signal other than the −45 degree polarization signal (which is the same as a +135 degree deviation signal) does not have a deviation difference of +45 or +90 degrees, which is the polarization angle corresponding to the polarization characteristic of the strip conductor, and as a result, a polarization signal other than the −45 degree polarization signal may be lost or fade rather than being normally transmitted through the strip conductor.

The strip conductor used in the radar device 100 according to the embodiments is very thin.

Referring to FIG. 4, the ferromagnetic material used in the radar device 100 according to the embodiments has a thickness of $\lambda/4$. Here, $\lambda$ may be a signal wavelength.

Meanwhile, a first transmission-side dielectric 510$t$, a second transmission-side dielectric 550$t$, a first reception-side dielectric 510$r$, and a second reception-side dielectric 550$r$ may have a thickness of $\lambda/2$.

The ferromagnetic material used in the radar device 100 according to the present embodiments may be, for example, ferrite.

Here, the ferrite may correspond to a ceramic, which has magnetism or acts on a magnetic field, and may be a term used for collectively referring to ferromagnetic iron oxide compounds. The ferrite may be largely divided into soft ferrite and hard ferrite depending on the degree of magnetization.

Such a ferromagnetic material may be formed of, for example, an anisotropic material or an anti-isotropic material.

Referring to FIG. 4, the ferromagnetic material having a thickness of $\lambda/4$ used in the radar device 100 according to the embodiments outputs an input polarization signal in a state in which a polarization angle of +45 degrees is added thereto.

For example, when a polarization signal input to a ferromagnetic material having a thickness of $\lambda/4$ is −45 degrees, the polarization angle of the polarization signal output from the ferromagnetic material having a thickness of $\lambda/4$ is 0 degrees (vertical angle) as +45 degrees is added to −45 degrees. That is, the ferromagnetic material outputs a polarization signal of the vertical angle.

When the ferromagnetic material, such as ferrite, is formed of an anisotropic material or anti-isotropic material having a thickness of $\lambda/4$, the polarization angle of the polarization signal is changed by +45 degrees while passing through the ferromagnetic material having the thickness of $\lambda/4$. This phenomenon is referred to as a "polarization phase shift phenomenon."

By using the characteristics of the strip conductor and the ferromagnetic material described above with reference to FIGS. 3 and 4, it is possible to reduce or prevent a side effect that may be caused by the upper cover UC provided in view of preventing antenna damage.

FIG. 5 is a view illustrating a radar device 100 according to a second embodiment.

Referring to FIG. 5, the radar device 100 according to the second embodiment may include at least one transmission antenna ANT_TX and at least one reception antenna ANT_RX.

As in FIG. 2, the radar device 100 according to the second embodiment may include a lower housing DH and an upper cover UC that accommodate the reception antenna ANT_RX.

The at least one transmission antenna ANT_TX may output a transmission polarization signal St having a predetermined transmission polarization angle θt.

While FIG. 5 illustrates that the radar device 100 includes only one transmission antenna ANT_TX for the convenience of explanation, the radar device 100 may include two or more transmission antennas ANT_TX.

Meanwhile, when the radar device 100 includes two or more transmission antennas ANT_TX, the two or more respective transmission antennas ANT_TX may have the same or different sensing ranges defined by a sensing distance and/or a sensing angle.

In addition, the two or more respective transmission antennas ANT_TX may output transmission polarization signals St having the same transmission polarization angle θt. Occasionally, the two or more transmission antennas ANT-TX may output transmission polarization signals St having different transmission polarization angles θt.

The at least one reception antenna ANT_RX may receive a reception polarization signal Sr having a predetermined reception polarization angle θr.

While FIG. 5 illustrates that the radar device 100 includes only one reception antenna ANT_RX for the convenience of explanation, the radar device 100 may include two or more reception antennas ANT_RX.

Meanwhile, in the case in which the radar device 100 includes two or more reception antennas ANT_RX, the two or more respective reception antennas ANT_RX may receive reception polarization signals Sr having the same reception polarization angle θr. Occasionally, the two or more reception antennas ANT-RX may receive reception polarization signals Sr having different reception polarization angles θr.

Referring to FIG. 5, between each transmission antenna ANT_TX and the upper cover UC, a first transmission-side dielectric 510t, a first transmission-side strip conductor 520t, a transmission-side ferromagnetic material 530t, a second transmission-side strip conductor 540t, a second transmission-side dielectric 550t, and the like may be sequentially stacked in that order from the top side of the transmission antenna ANT_TX.

In addition, between each reception antenna ANT_TX and the upper cover UC, a first reception-side dielectric 510r, a first reception-side strip conductor 520r, a reception-side ferromagnetic material 530r, a second reception-side strip conductor 540r, a second reception-side dielectric 550r, and the like may be sequentially stacked in that order from the top side of the reception antenna ANT_RX.

Each of the first transmission-side strip conductor 520t, the second transmission-side strip conductors 540t, the first reception-side strip conductor 520r, and the second reception-side strip conductors 540r described above has the characteristics (orthogonal polarization characteristics), which are the same as or similar to those of the strip conductor described above with reference to FIG. 3.

In addition, each of the transmission-side ferromagnetic material 530t and the reception-side ferromagnetic material 530r has the characteristics (e.g., a polarization phase shift characteristic), which are the same as those of the ferromagnetic material described above with reference to FIG. 4.

First, the transmission-side stacked structure will be described.

The transmission antenna ANT_TX transmits a transmission polarization signal St having a transmission polarization angle θt.

The first transmission-side dielectric 510t is positioned on the transmission antenna ANT_TX.

The first transmission-side strip conductor 520t is positioned on the first transmission-side dielectric 510t and has a polarization characteristic of a predetermined first polarization angle θ1. The first transmission-side strip conductor 520t may allow only a signal having a polarization angle, which is different from the first polarization angle θ1 by 90 degrees, to pass therethrough.

The transmission-side ferromagnetic material 530t is positioned on the first transmission-side strip conductor 520t, and may output a signal input thereto in a state in which the polarization angle of the input signal is changed by +45 degrees.

The second transmission-side strip conductor 540t is positioned on the transmission-side ferromagnetic material 530t and has a polarization characteristic of a predetermined second polarization angle θ2. The second transmission-side strip conductor 540t may allow only a signal having a polarization angle, which is different from the second polarization angle θ2 by 90 degrees, to pass therethrough.

The second transmission-side dielectric 550t is positioned on the second transmission-side strip conductor 540t.

A signal is radiated to the outside through the upper cover UC via the second transmission-side dielectric 550t.

Next, the reception-side stacked structure will be described.

The second reception-side dielectric 550r is positioned below the upper cover UC.

The second reception-side strip conductor 540r is positioned below the second reception-side dielectric 550r and has a polarization characteristic of a predetermined fourth polarization angle θ4. The second reception-side strip conductor 540r may allow only a signal having a polarization angle, which is different from the fourth polarization angle θ4 by 90 degrees, to pass therethrough.

The reception-side ferromagnetic material 530r is positioned below the second reception-side strip conductor 540r, and may output a signal input thereto in a state in which the polarization angle of the input signal is changed by +45 degrees through the second reception-side strip conductor 540r.

The first reception-side strip conductor 520r is positioned below the reception-side ferromagnetic material 530r and has a polarization characteristic of a predetermined third polarization angle θ3. The first reception-side strip conductor 510r may allow only a signal having a polarization angle, which is different from the third polarization angle θ3 by 90 degrees, to pass therethrough.

The signal output from the first reception-side strip conductor 520r is input to the reception antenna ANT_RX via the first reception-side dielectric 510r positioned below the first reception-side strip conductor 520r.

Figure 7A:
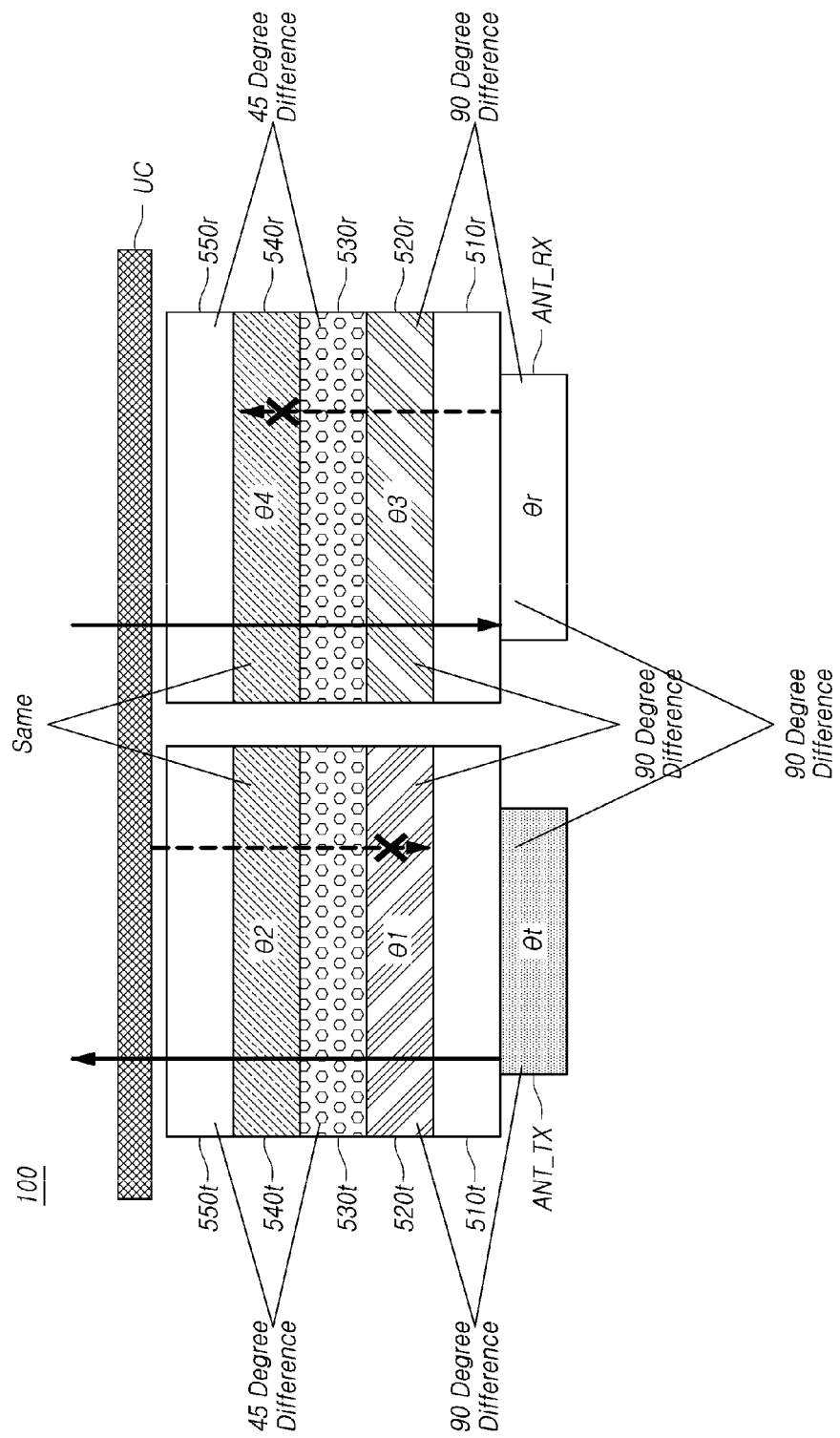
FIGS. 7A and 7B are views for explaining the reflection reduction effect of the radar device according to the second embodiment.
Figure 7B:
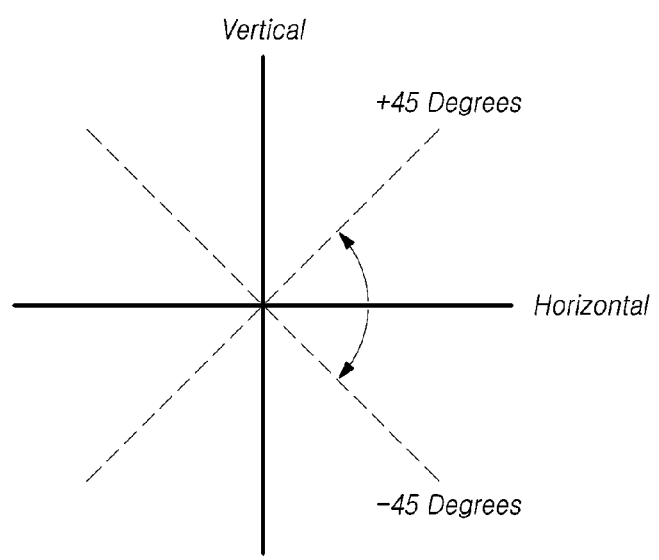

FIG. 6 is a view illustrating structural features of the radar device 100 according to the second embodiment, and FIGS. 7A and 7B are views for explaining the reflection reduction effect of the radar device 100 according to the second embodiment.

Referring to FIG. 6, in the radar device 100 according to the second embodiment, the transmission polarization angle θt of the transmission antenna ANT_TX is different from the reception polarization angle θr of the reception antenna ANT_RX by 90 degrees.

The transmission polarization angle θt of the transmission antenna ANT_TX means a polarization angle of a transmission polarization signal St transmitted from the transmission antenna ANT_TX.

The reception polarization angle θr of the reception antenna ANT_RX means a polarization angle of a reception polarization signal Sr received by the reception antenna ANT_RX.

The transmission-side ferromagnetic material 530t and the reception-side ferromagnetic material 530r may have a thickness of $\lambda/4$.

The transmission polarization angle θt of the transmission antenna ANT_TX may be different from the first polarization angle θ1 of the first transmission-side strip conductor 520t by 90 degrees.

The reception polarization angle θr of the reception antenna ANT_RX may be different from the third polarization angle θ3 of the first reception-side strip conductor 520r by 90 degrees.

The first polarization angle θ1 of the first transmission-side strip conductor 520t may be different from the third polarization angle θ3 of the first reception-side strip conductor 520r by 90 degrees.

The second polarization angle θ2 of the second transmission-side strip conductor 540t may be the same as the fourth polarization angle θ4 of the second reception-side strip conductor 540r.

The first polarization angle θ1 of the first transmission-side strip conductor 520t may be different from the second polarization angle θ2 of the second transmission-side strip conductor 540t by 45 degrees.

The third polarization angle θ3 of the first reception-side strip conductor 520r may be different from the second polarization angle θ2 of the second reception-side strip conductor 540r by 45 degrees.

The above-described structural features may be expressed as the relationship(s) between polarization angles in Equation 1 as follows.

$$\theta t = \theta r - 90°$$
$$\theta 1 = \theta t + 90°$$
$$\theta 3 = \theta r + 90°$$
$$\theta 1 = \theta 3 + 90°$$
$$\theta 2 = \theta 4 = \theta 1 + 45° \quad \text{Equation 1}$$

A signal flow within the radar device 100, in which a transmission polarization signal St having a transmission polarization angle θt is transmitted from the transmission antenna ANT_TX according to the structural features described above with reference to FIG. 6 and then radiated to the outside of the radar device 100, will be described with reference to FIGS. 7A and 7B. Here, FIG. 7B represents various angular components.

The transmission antenna ANT_TX transmits a transmission polarization signal St having a transmission polarization angle θt.

The transmission polarization signal St having the transmission polarization angle θt and transmitted from the transmission antenna ANT_TX is input to the first transmission-side strip conductor 520t through the first transmission-side dielectric 510t.

When the transmission polarization signal St having the transmission polarization angle θt is input through the first transmission-side dielectric 510t, the first transmission-side strip conductor 520t allows the transmission polarization signal St to pass therethrough without change when the transmission polarization angle θt of the transmission polarization signal is different from the first polarization angle θ1 of the first transmission-side strip conductor 520t by 90 degrees. Otherwise, the first transmission-side strip conductor 520t does not allow the passage of the transmission polarization signal St.

Since the first polarization angle θ1 of the first transmission-side strip conductor 520t is set to be different from the transmission polarization angle θt by 90 degrees, the polarization angle of the signal transmitted through the first transmission-side strip conductor 520t becomes the transmission polarization angle θt.

When a signal output from the first transmission-side strip conductor 520t is input to the transmission-side ferromagnetic material 530t, the transmission-side ferromagnetic material 530t may output the input signal in a state in which θt, which is the polarization angle of the input signal, is changed by +45 degrees.

The polarization angle of a signal output from the transmission-side ferromagnetic material 530t becomes "θt+45 degrees" since +45 degrees is added to the transmission polarization angle θt of the transmission polarization signal St.

When a signal output from the transmission-side ferromagnetic material 530t is input to the second transmission-side strip conductor 540t, the second transmission-side strip conductor 540t may output the input signal without change when the polarization angle (θt+45 degrees) of the input signal is different from the second polarization angle θ2 of the second transmission-side strip conductor 540t by 90 degrees. Otherwise, the second transmission-side strip conductor 540t does not output the signal.

Since the second polarization angle θ2 of the second transmission-side strip conductor 540t is set to be different from "θt+45 degrees" by 90 degrees, the polarization angle of a signal output from the second transmission-side strip conductor 540t has a polarization angle of θt+45 degrees.

The signal output from the second transmission-side strip conductor 540t is radiated to the outside via the second transmission-side dielectric 550t and the upper cover UC.

The signal radiated in this way has a polarization angle of θt+45 degrees.

When a signal, which has passed through the second transmission-side dielectric 550t, is reflected from the upper cover UC, the reflected wave have a polarization angle of θt+45 degrees.

Since the second polarization angle θ2 of the second transmission-side strip conductor 540t is set to be different from "θt+45 degrees" by 90 degrees, a reflected wave reflected from the upper cover UC passes through the second transmission-side strip conductor 540t.

When the reflected wave, which has passed through the second transmission-side strip conductor 540t, passes through the transmission-side ferromagnetic material 530t, the polarization angle is changed by +45 degrees.

Therefore, the reflected wave that has passed through the transmission-side ferromagnetic material 530t has a polarization angle of θt+90 degrees.

Since the first polarization angle θ1 of the first transmission-side strip conductor 520t is set to be different from the transmission polarization angle θt by 90 degrees, the reflected wave, which has passed through the transmission-side ferromagnetic material 530t, cannot pass through the first transmission-side strip conductor 520t.

Therefore, the reflected wave does not reach the transmission antenna ANT_TX. As a result, it is possible to prevent deterioration of target sensing performance, which is caused due to a reflected wave.

A signal flow of a signal, which enters the inside of the radar device 100 and reaches the reception antenna ANT_RX in the case where an electromagnetic wave radiated from the radar device 100 is reflected from a target and enters the inside of the radar device 100 according to the structural features described above with reference to FIG. 6, will be described with reference to FIGS. 7A and 7B.

Assuming that a transmission antenna ANT_TX transmits a transmission polarization signal St having a transmission polarization angle θt so that a signal (electromagnetic wave) having a polarization angle of θt+45 degrees is radiated to the outside, and this signal is reflected from a target and enters the inside of the radar device 100 via the upper cover UC, the signal, which has entered the inside of the radar device 100, is input to the second reception-side strip conductor 540r positioned below the second reception-side dielectric 550r via the second reception-side dielectric 550r.

Since the fourth polarization angle θ4 of the second reception-side strip conductor 540r is set to be different from "θt+45 degrees" by 90 degrees, the second reception-side strip conductor 540r may allow an input signal having a polarization angle of θt+45 degrees to pass therethrough without change.

The signal, which has passed through the second reception-side strip conductor 540r, is output through the reception-side ferromagnetic material 530r in a state where the polarization angle of the signal is changed by +45 degrees.

Accordingly, the signal output from the reception-side ferromagnetic material 530r has a polarization angle of "θt+90 degrees."

A signal output from the reception-side ferromagnetic material 530r is input to the first reception-side strip conductor 520r.

Since the third polarization angle θ3 of the first reception-side strip conductor 520r is different from the fourth polarization angle θ4 of the second reception-side strip conductor 540r by 45 degrees, the third polarization angle θ3 of the first reception-side strip conductor 520r corresponds to "θ4−45 degrees." Here, "θ4−45 degrees" corresponds "θt (=θt+45 degrees−45 degrees)."

The polarization angle (θt+90 degrees) of a signal input to the first reception-side strip conductor 520r is different from the third polarization angle (θ3=θt) of the first reception-side strip conductor 520r by 90 degrees.

Therefore, a signal input to the first reception-side strip conductor 520r and having a polarization angle of "θt+90 degrees" passes through the first reception-side strip conductor 520r without change.

The signal, which has passed through the first reception-side strip conductor 520r, is input to the reception antenna ANT_RX via the first reception-side dielectric 510r.

Since the transmission polarization angle θt of the transmission antenna ANT_TX is different from the reception polarization angle θr of the reception antenna ANT_RX by 90 degrees (i.e., θt=θr−90 degrees), the polarization angle of a signal input to the reception antenna ANT_RX (θt+90 degrees) is the same as the reception polarization angle θr of the reception antenna ANT_RX.

In a case where a signal having a reception polarization angle θr, i.e., a polarization angle of θt+90 degrees, is reflected from the reception antenna ANT_RX, the third polarization angle θ3 of the first reception-side strip conductor 520r is equal to θt so that the reflected wave having the polarization angle of θt+90 degrees passes through the first reception-side strip conductor 520r having the third polarization angle θ3.

In addition, while the reflected wave, which has passed through the first reception-side strip conductor 520r, passes through the reception-side ferromagnetic material 530r, the polarization angle of the reflected wave is changed from θt+90 degrees to θt+135 degrees (=θt−45 degrees).

Since the fourth polarization angle θ4 of the second reception-side strip conductor 540r corresponds to θt+135 degrees (=θt−45 degrees), the reflected wave, which has passed through the reception-side ferromagnetic material 530r, cannot pass through the second reception-side strip conductor 540r.

Therefore, it is possible to prevent the reflected wave, which has entered the inside of the radar device 100, from being reflected again and radiated to the outside, thereby improving the target sensing performance.

According to the above description, the signal R1 directed from the upper cover UC toward the transmission antenna ANT_TX is not transmitted to the transmission antenna ANT_TX.

The signal R2 directed from the upper cover UC toward the reception antenna ANT_RX is not transmitted to the reception antenna ANT_RX. The signal R3 reflected from the transmission antenna ANT_TX or the reception antenna ANT_RX and directed toward the upper cover UC cannot pass through the upper cover UC.

FIGS. 8 to 11 are views illustrating implemented examples of the radar device 100 according to the second embodiment.

The implemented examples of the radar device 100 according to the second embodiment illustrated in FIGS. 8 to 11 satisfy all the structural features described above with reference to FIG. 6 (θt=θr−90 degrees, θ1=θt+90 degrees, θ3=θr+90 degrees, θ1=θ3+90 degrees, and θ2=θ4=θ1+45 degrees).

Figure 8:
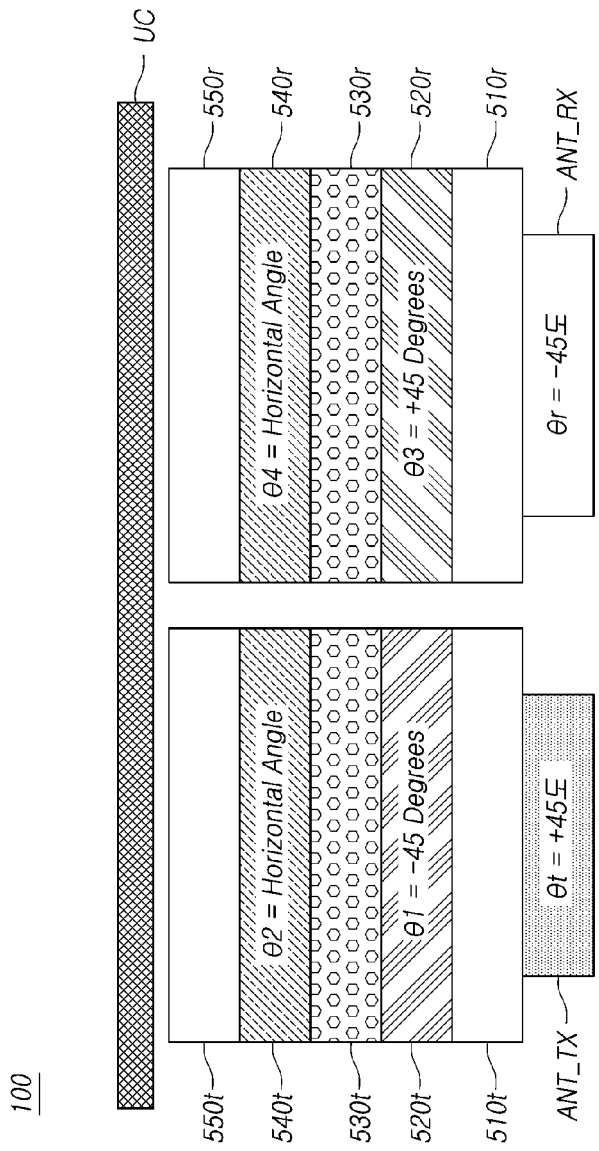
FIGS. 8 to 11 are views illustrating implemented examples of the radar device according to the second embodiment.

In the radar device 100 according to the second embodiment illustrated in FIG. 8, the transmission polarization angle θt of the transmission antenna ANT_TX is +45 degrees, and the reception polarization angle θr of the reception antenna ANT_RX is −45 degrees.

Referring to FIG. 8, the first polarization angle θ1 of the first transmission-side strip conductor 520t is −45 degrees, and the third polarization angle θ3 of the first reception-side strip conductor 520r is +45 degrees.

Referring to FIG. 8, the second polarization angle θ2 of the second transmission-side strip conductor 540t and the fourth polarization angle θ4 of the second reception-side strip conductor 540r are horizontal angles.

That is, in FIG. 8, θt=+45 degrees (=−135 degrees), θ1=−45 degrees (=+135 degrees), θ2=0 degrees, θr=−45 degrees (=+135 degrees), θ3=+45 degrees (=−135 degrees), and θ4=0 degrees.

Accordingly, the structural features (θt=θr−90 degrees, θ1=θt+90 degrees, θ3=θr+90 degrees, θ1=θ3+90 degrees, and θ2=θ4=θ1+45 degrees) of the radar device 100 according to the second embodiment are satisfied.

Figure 9:
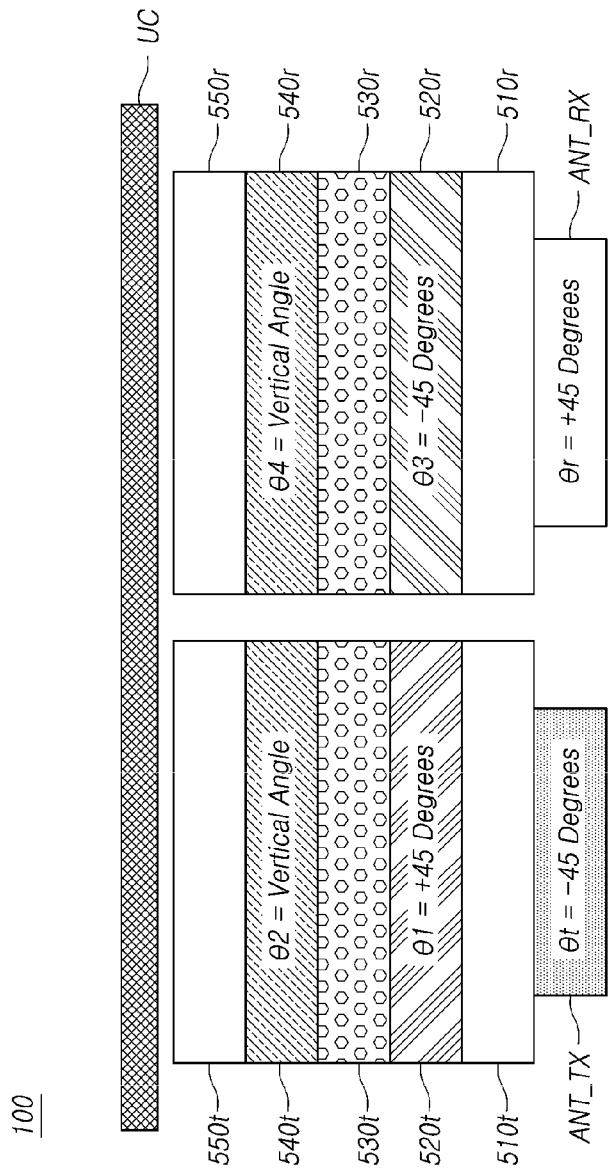

In the radar device 100 according to the second embodiment illustrated in FIG. 9, the transmission polarization angle θt of the transmission antenna ANT_TX is −45 degrees, the reception polarization angle θr of the reception antenna ANT_RX is +45 degrees, the first polarization angle θ1 of the first transmission-side strip conductor 520t is +45 degrees, the third polarization angle θ3 of the first reception-side strip conductor 520r is −45 degrees, and the second polarization angle θ2 of the second transmission-side strip conductor 540t and the fourth polarization angle θ4 of the second reception-side strip conductor 540r are vertical angles.

That is, in FIG. 9, θt=−45 degrees (=+135 degrees), θ1=+45 degrees (=−135 degrees), θ2=0 degrees, θr=+45 degrees (=−135 degrees), θ3=−45 degrees (=+135 degrees), and θ4=90 degrees.

Accordingly, the structural features (θt=θr−90 degrees, θ1=θt+90 degrees, θ3=θr+90 degrees, θ1=θ3+90 degrees, and θ2=θ4=θ1+45 degrees) of the radar device 100 according to the second embodiment are satisfied.

Figure 10:
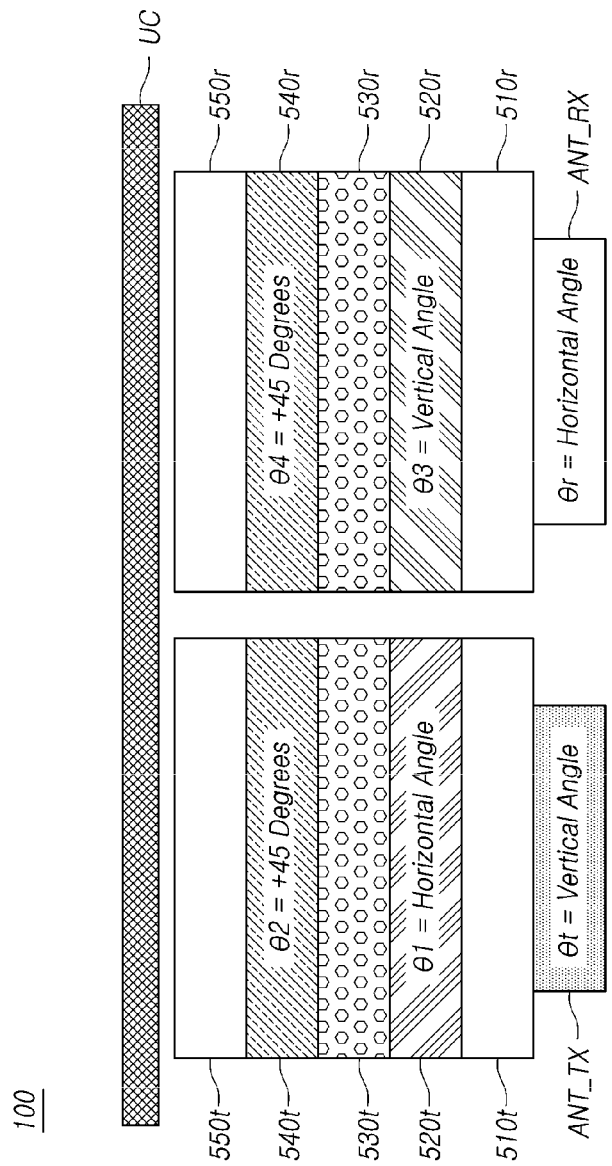

In the radar device 100 according to the second embodiment illustrated in FIG. 10, the transmission polarization angle θt of the transmission antenna ANT_TX is a vertical angle, the reception polarization angle θr of the reception antenna ANT_RX is a horizontal angle, the first polarization angle θ1 of the first transmission-side strip conductor 520t is a horizontal angle, the third polarization angle θ3 of the first reception-side strip conductor 520r is a vertical angle, and the second polarization angle θ2 of the second transmission-side strip conductor 540t and the fourth polarization angle θ4 of the second reception-side strip conductor 540r are +45 degrees.

That is, in FIG. 10, θt=a vertical angle (=+90 degrees=−90 degrees), θ1=a horizontal angle (=0 degrees=−180 degrees=+180 degrees), θ2=+45 degrees (=−135 degrees), θr=a horizontal angle (=0 degrees=−180 degrees=+180 degrees), θ3=a vertical angle (=+90 degrees=−90 degrees), and θ4=+45 degrees (=−135 degrees).

Accordingly, the structural features (θt=θr−90 degrees, θ1=θt+90 degrees, θ3=θr+90 degrees, θ1=θ3+90 degrees, and θ2=θ4=θ1+45 degrees) of the radar device 100 according to the second embodiment are satisfied.

Figure 11:
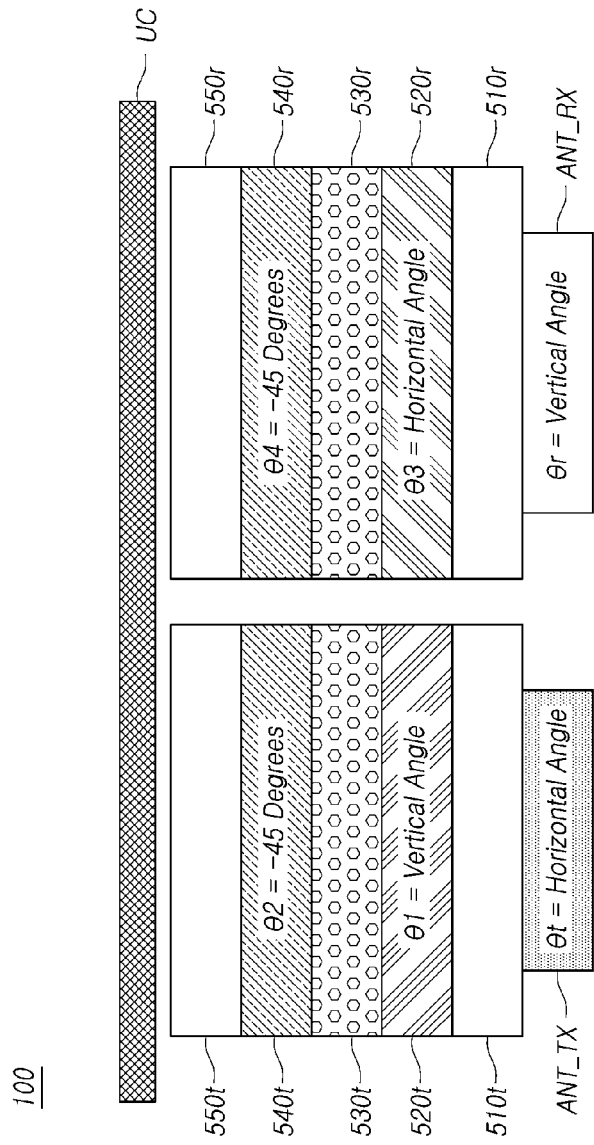

In the radar device 100 according to the second embodiment illustrated in FIG. 11, the transmission polarization angle θt of the transmission antenna ANT_TX is a horizontal angle, the reception polarization angle θr of the reception antenna ANT_RX is a vertical angle, the first polarization angle θ1 of the first transmission-side strip conductor 520t is a vertical angle, the third polarization angle θ3 of the first reception-side strip conductor 520r is a horizontal angle, and the second polarization angle θ2 of each of the second transmission-side strip conductor 540t and the second reception-side strip conductor 540r is −45 degrees.

That is, in FIG. 11, θt=a horizontal angle (=0 degrees=−180 degrees=180 degrees), θ1=a vertical angle (=+90 degrees=−90 degrees), θ2=−45 degrees (=+135 degrees), θr=a vertical angle (=+90 degrees=−90 degrees), θ3=a horizontal angle (=0 degrees=−180 degrees=+180 degrees), and θ4=−45 degrees (=+135 degrees).

Accordingly, the structural features (θt=θr−90 degrees, θ1=θt+90 degrees, θ3=θr+90 degrees, θ1=θ3+90 degrees, and θ2=θ4=θ1+45 degrees) of the radar device 100 according to the second embodiment are satisfied.

In the radar device 100 according to the second embodiment shown in FIGS. 5 to 11, the first transmission-side dielectric 510t and the first reception-side dielectric 510r may be integrated and stacked on the same layer, the transmission-side ferromagnetic material 530t and the reception-side ferromagnetic material 530r may be integrated and stacked on the same layer, the second transmission-side strip conductor 540t and the second reception-side strip conductor 540r may be integrated and stacked on the same layer, and the second transmission-side dielectric 550t and the second reception-side dielectric 550r may be integrated and stacked on the same layer.

Figure 12:
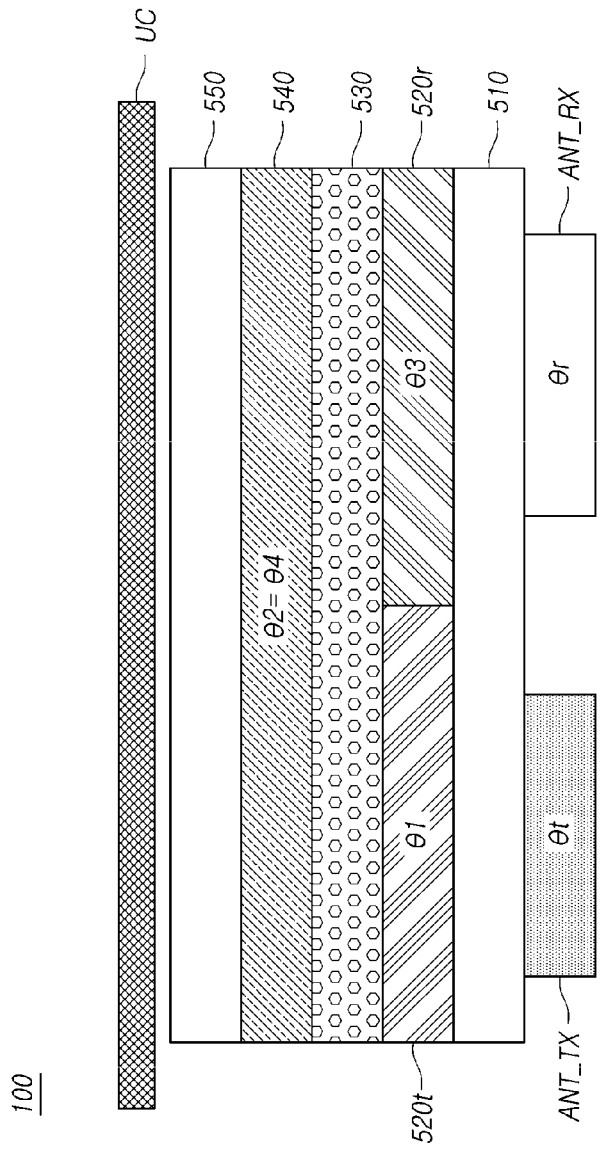
FIG. 12 is a view illustrating a radar device according to a third embodiment.

FIG. 12 illustrates a radar device 100 according to a third embodiment having the stacked structure as described above.

FIG. 12 is a view illustrating a radar device 100 according to a third embodiment.

Referring to FIG. 12, in the radar device 100 according to the third embodiment, a first dielectric layer 510, in which the first transmission-side dielectric 510t and the first reception-side dielectric 510r of FIG. 5 are integrated, may be positioned on a transmission antenna ANT_TX and a reception antenna ANT_RX.

On the first dielectric layer 510, a first transmission-side strip conductor 520t and a first reception-side strip conductor 520r may be positioned in a transmission antenna region and a reception antenna region, respectively.

A ferromagnetic layer 530, in which the transmission-side ferromagnetic material 530t and the reception-side ferromagnetic material 530r of FIG. 5 are integrated, may be positioned on the region in which the first transmission-side strip conductor 520t and the first reception-side strip conductor 520r are stacked.

On the ferromagnetic layer 530, a second strip conductor layer 540, in which the second transmission-side strip conductor 540t and the second reception-side strip conductor 540r of FIG. 5 are integrated, may be positioned.

On the second strip conductor layer 540, a second dielectric layer 550, in which the second transmission-side dielectric 550t and the second reception-side dielectric 550r of FIG. 5 are integrated, may be positioned.

The radar device 100 according to the third embodiment satisfies, without change, the structural features (θt=θr−90 degrees, θ1=θt+90 degrees, θ3=θr+90 degrees, θ1=θ3+90 degrees, and θ2=θ4=θ1+45 degrees) described above with reference to FIG. 6.

Figure 13:
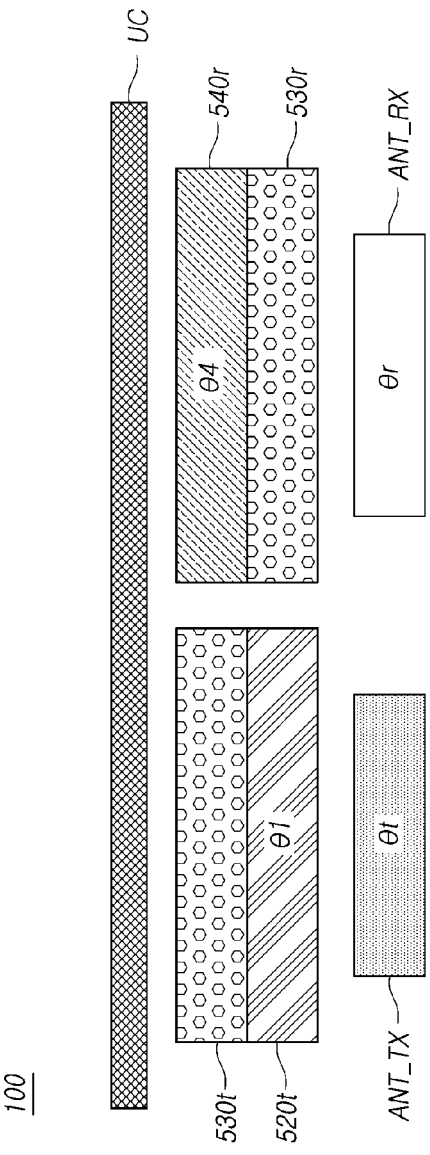
FIG. 13 is a view illustrating a radar device according to a fourth embodiment.

FIG. 13 is a view illustrating a radar device 100 according to a fourth embodiment.

Referring to FIG. 13, the radar device 100 according to the fourth embodiment may include at least one transmission antenna ANT_TX that outputs a transmission polarization signal St of a predetermined transmission polarization angle θt, a first transmission-side strip conductor 520t positioned on the transmission antenna ANT_TX, a transmission-side ferromagnetic material 530t positioned on the transmission-side strip conductor, at least one reception antenna ANT_RX that receives a reception polarization signal Sr having a predetermined reception polarization angle θr, a reception-side ferromagnetic material 530r located on the reception antenna ANT_RX, a fourth reception-side strip conductor 540r positioned on the reception-side ferromagnetic material 530r, and the like.

In addition, the radar device 100 according to the fourth embodiment may include a lower housing DH and an upper cover UC that accommodate the transmission antenna ANT_TX, the first transmission-side strip conductor 520t, the transmission-side ferromagnetic material 530t, the reception antenna ANT_RX, the reception-side ferromagnetic material 530r, and the fourth reception-side strip conductor 540r, as illustrated in FIG. 2.

Meanwhile, an air layer serving as a dielectric layer may exist between the transmission antenna ANT_TX and the first transmission-side strip conductor 520t and between the transmission-side ferromagnetic material 530t and the upper cover UC.

In addition, an air layer serving as a dielectric layer may exist between the upper cover UC and the fourth reception-side strip conductor 540r and between the reception-side ferromagnetic material 530r and the reception antenna ANT_RX.

Figure 14:
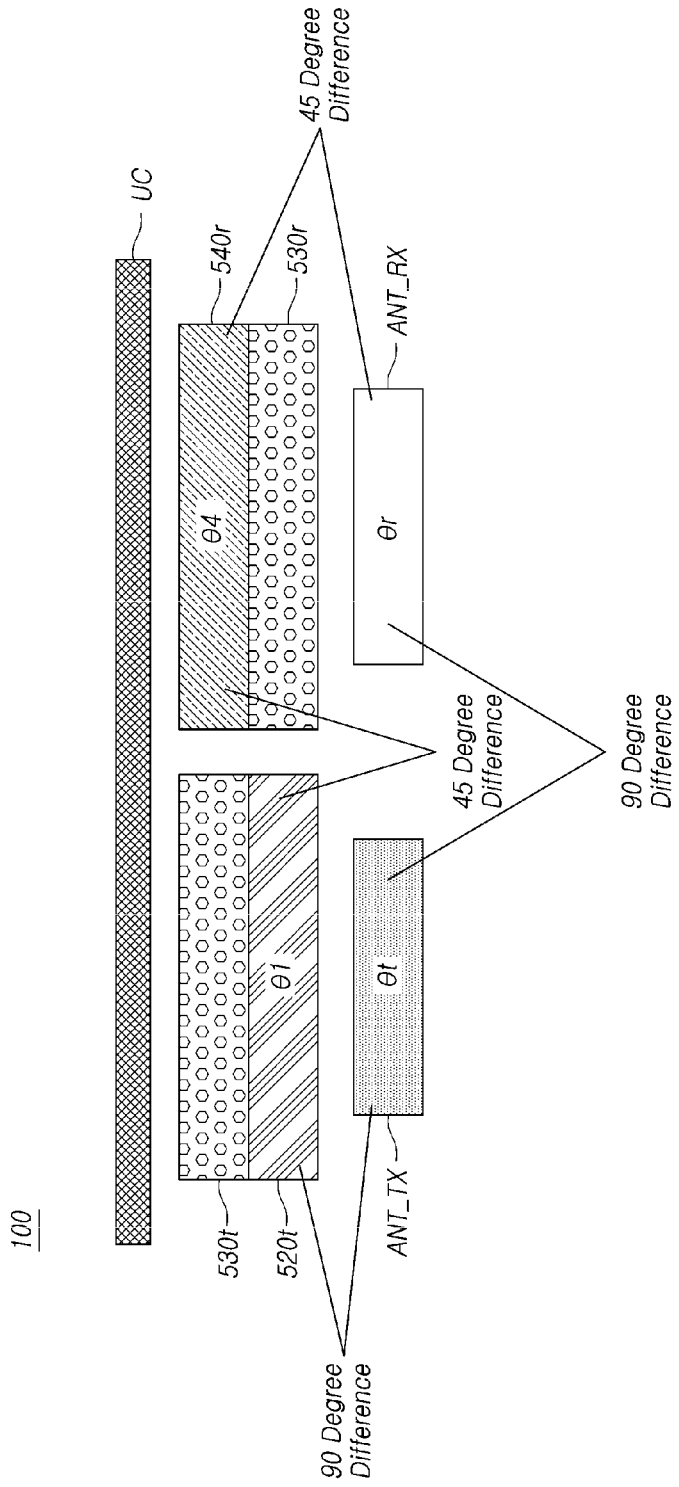
FIG. 14 is a view illustrating structural features of the radar device according to the fourth embodiment.
Figure 15:
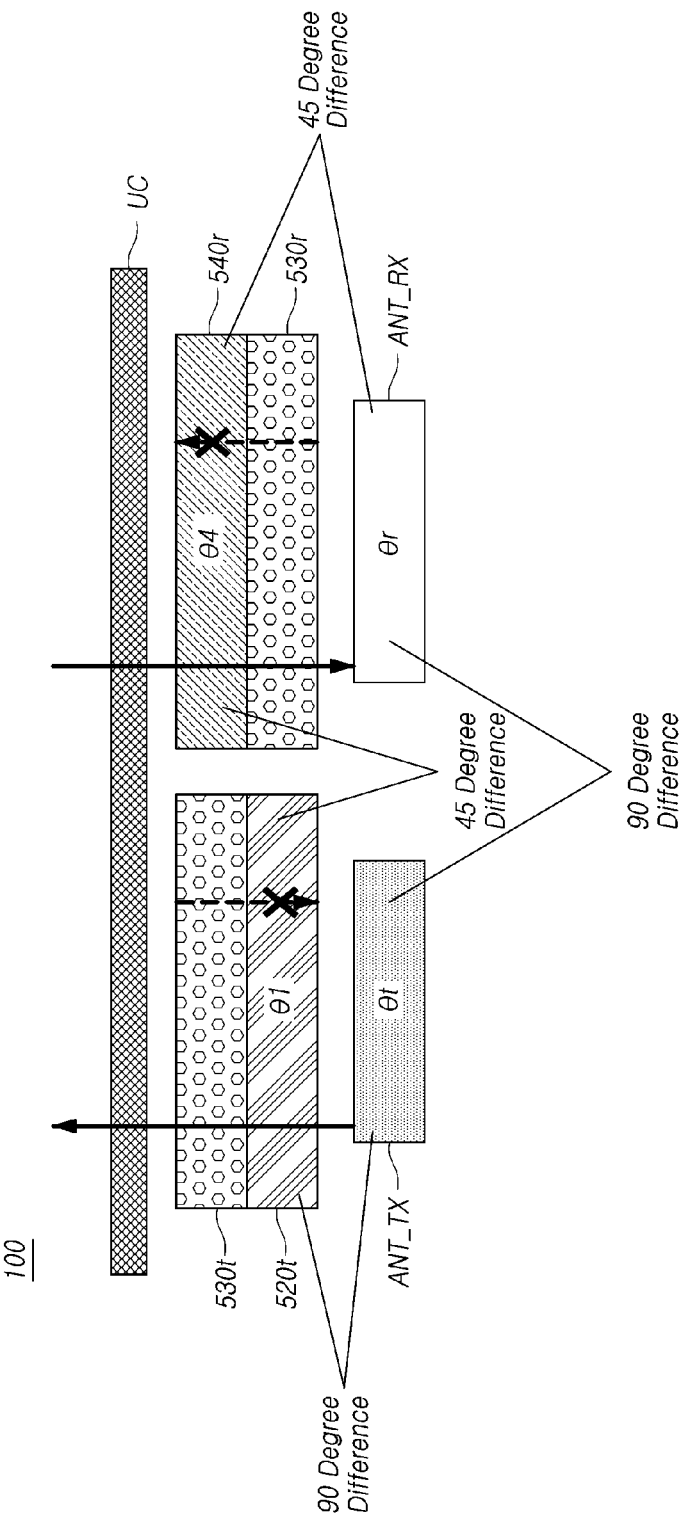
FIG. 15 is a view illustrating the reflection reduction effect of the radar device according to the fourth embodiment.

FIG. 14 is a view illustrating structural features of the radar device 100 according to the fourth embodiment, and FIG. 15 is a view illustrating the reflection reduction effect of the radar device 100 according to the fourth embodiment.

Referring to FIG. 14, the transmission polarization angle θt of the transmission antenna ANT_TX is different from the reception polarization angle θr of the reception antenna ANT_RX by 90 degrees.

Referring to FIG. 14, the transmission polarization angle θt of the transmission antenna ANT_TX is different from the polarization angle θ1 of the first transmission-side strip conductor 520t by 90 degrees.

In addition, the reception polarization angle θr of the reception antenna ANT_RX may be different from the polarization angle θ4 of the fourth reception-side strip conductor 540r by 45 degrees.

The polarization angle θ1 of the first transmission-side strip conductor 520t may be different from the polarization angle θ4 of the fourth reception-side strip conductor 540r by 45 degrees.

These structural features may be defined by Equation 2.

$$\theta t = \theta r - 90°$$
$$\theta 1 = \theta t + 90°$$
$$\theta 4 = \theta r - 45° \qquad \text{Equation 2}$$

Each of the transmission-side ferromagnetic material 530t and the reception-side ferromagnetic material 530r may have a thickness of λ/4.

According to the structural features described above (θt=θr−90 degrees, θ1=θt+90 degrees, and θ4=θr−45 degrees), a transmission polarization signal St may be transmitted from the transmission antenna ANT_TX and may be radiated to the outside of the radar device 100 via the first transmission-side strip conductor 520t and the transmission-side ferromagnetic material 530t.

The polarization angle of the signal radiated to the outside of the radar device 100 is "θt+45 degrees."

Meanwhile, when a signal output through the transmission-side ferromagnetic material 530t is reflected by the inner surface of the upper cover UC, the reflected wave has a polarization angle of "θt+45 degrees."

After the reflected wave passes through the transmission-side ferromagnetic material 530t, the polarization angle is changed by +45 degrees.

The polarization angle changed in this way becomes "θt+90 degrees."

Therefore, since the polarization angle (θt+90 degrees) of the reflected wave, which has passed through the transmission-side ferromagnetic material 530t, is not different from the polarization angle (θ1=θt+90 degrees) of the first transmission-side strip conductor 520t by 90 degrees, the reflected wave, which has passed through the transmission-side ferromagnetic material 530t, cannot pass through the first transmission-side strip conductor 520t.

Therefore, the reflected wave within the radar device 100 cannot reach the transmission antenna ANT_TX.

Meanwhile, a reflected wave, which corresponds to a signal radiated to the outside of the radar device 100 and then reflected by an external target, may be received by the reception antenna ANT_RX via the fourth reception-side strip conductor 540r and the reception-side ferromagnetic material 530r.

This is because the polarized angle (θt+45 degrees) of the reflected wave, which corresponds to a signal radiated to the outside of the radar device 100 and then reflected by an external target, is different from the polarization angle θ4 of the fourth reception-side strip conductor 540r by 90 degrees.

The polarization angle of the signal received by the reception antenna ANT_RX (i.e., the reception polarization signal Sr) is θt+90 degrees (=θr−90 degrees+90 degrees), and becomes equal to the reception polarization angle θr of the reception polarization signal Sr according to Equation 2.

The reflected wave (having a polarization angle of θt+45 degrees), which has passed through the reception-side ferromagnetic material 530r, passes through the reception-side ferromagnetic material 530r again when the reflected wave is reflected by the reception antenna ANT_RX.

Thus, the reflected wave, which has passed through the reception-side ferromagnetic material 530r, is subjected to a change in polarization angle by +45 degrees to have a polarization angle of θt+90 degrees.

The polarization angle θ4 of the fourth reception-side strip conductor 540r becomes θt+45 degrees (=θr−45 degrees=θt+90 degrees−45 degrees) using Equation 2.

Therefore, since the polarization angle (θ4=θt+45 degrees) of the fourth reception-side strip conductor 540r and the polarization angle (θt+90 degrees) of the reflected wave input to the fourth reception-side strip conductor 540r are not different from each other by 90 degrees, the reflected wave cannot pass through the fourth reception-side strip conductor 540r.

Therefore, even if the reflected wave reflected from a target outside the radar device 100 is reflected again inside the radar device 100, the reflected wave is not radiated to the outside, so that it is possible to prevent an erroneous signal from being reflected again by the target to enter the inside of the radar device 100 again.

Figure 16:
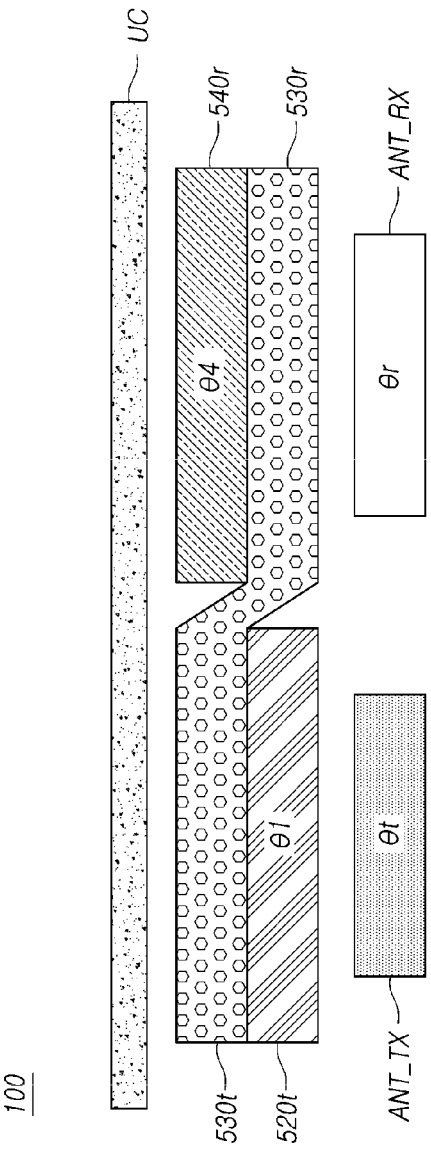
FIG. 16 is a view illustrating a radar device according to a fifth embodiment.

FIG. 16 is a view illustrating a radar device 100 according to a fifth embodiment.

The radar device 100 according to the fifth embodiment illustrated in FIG. 16 may have a structure, in which the transmission-side ferromagnetic material 530t and the reception-side ferromagnetic material 530r of the radar device 100 according to the fourth embodiment of FIG. 15 are integrated and stacked.

According to the above-described embodiments, it is possible to provide a laser device 100 having a cover structure that is capable of protecting antennas ANT_TX and ANT_RX from the outside.

According to the embodiments, it is possible to provide a radar device 100 having an internal reflected wave influence reduction structure (stacked structure), which is capable of preventing a target sensing performance from being deteriorated by a reflected wave reflected within the radar device, even though the radar device 100 has a cover structure that is capable of protecting antennas ANT_TX and ANT_RX from the outside.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A radar device comprising:
    at least one transmission antenna configured to output a transmission polarization signal having a predetermined transmission polarization angle;
    at least one reception antenna configured to receive a reception polarization signal having a predetermined reception polarization angle; and
    a lower housing and an upper cover configured to accommodate the at least one transmission antenna and the at least one reception antenna,
    wherein, between the at least one transmission antenna and the upper cover, a transmission-side ferromagnetic material exists and a first transmission-side strip conductor positioned above the transmission-side ferromagnetic material and/or a second transmission-side strip conductor positioned below the transmission-side ferromagnetic material further exist, and wherein, between the at least one reception antenna and the upper cover, a reception-side ferromagnetic material exists and a first reception-side strip conductor positioned above the reception-side ferromagnetic material a second reception-side strip conductor positioned below the reception-side ferromagnetic material further exist.

2. The radar device of claim 1, wherein, between the transmission antenna and the upper cover, a first transmission-side dielectric, the first transmission-side strip conductor, the transmission-side ferromagnetic material, the second transmission-side strip conductor, and a second transmission-side dielectric are stacked in that order, and wherein, between the reception antenna and the upper cover, a first reception-side dielectric, the first reception-side strip conductor, the reception-side ferromagnetic material, the second reception-side strip conductor, and a second reception-side dielectric are stacked in that order.

3. The radar device of claim 2, wherein the first transmission-side dielectric and the first reception-side dielectric are integrated and stacked on a same layer, the transmission-side ferromagnetic material and the reception-side ferromagnetic material are integrated and stacked on a same layer, the second transmission-side strip conductor and the second reception-side strip conductor are integrated and stacked on a same layer, and the second transmission-side dielectric and the second reception-side dielectric are integrated and stacked on a same layer.

4. The radar device of claim 1, wherein the transmission polarization angle of the transmission antenna and the reception polarization angle of the reception antenna are different from each other by 90 degrees.

5. The radar device of claim 1, wherein the transmission-side ferromagnetic material and the reception-side ferromagnetic material have a thickness of λ/4.

6. The radar device of claim 1, wherein the first transmission-side strip conductor has a polarization characteristic of a predetermined first polarization angle and allows only a signal that has a polarization angle that is different from the first polarization angle by 90 degrees to pass therethrough, the transmission-side ferromagnetic material outputs a signal input thereto in a state in which a polarization angle of the input signal is changed by +45 degrees, the second transmission-side strip conductor has a polarization characteristic of a predetermined second polarization angle and allows only a signal that has a polarization angle that is different from the second polarization angle by 90 degrees to pass therethrough, the second reception-side strip conductor has a polarization characteristic of a predetermined fourth polarization angle and allows only a signal that has a polarization angle that is different from the fourth polarization angle by 90 degrees to pass therethrough, the reception-side ferromagnetic material outputs a signal input thereto in a state in which a polarization angle of the input signal is changed by +45 degrees, and the first reception-side strip conductor has a polarization characteristic of a predetermined third polarization angle and allows only a signal that has a polarization angle that is different from the third polarization angle by 90 degrees to pass therethrough.

7. The radar device of claim 6, wherein the transmission polarization angle of the transmission antenna and the first polarization angle of the first transmission-side strip conductor are different from each other by 90 degrees, the reception polarization angle of the reception antenna and the third polarization angle of the first reception-side strip conductor are different from each other by 90 degrees, the first polarization angle of the first transmission-side strip conductor and the third polarization angle of the first reception-side strip conductor are different from each other by 90 degrees, the second polarization angle of the second transmission-side strip conductor and the fourth polarization angle of the second reception-side strip conductor are equal to each other, the first polarization angle of the first transmission-side strip conductor and the second polarization angle of the second reception-side strip conductor are different from each other by 45 degrees, and the third polarization angle of the first reception-side strip conductor and the second polarization angle of the second reception-side strip conductor are different from each other by 45 degrees.

8. The radar device of claim 6, wherein the transmission polarization angle of the transmission antenna is +45 degrees, the reception polarization angle of the reception antenna is −45 degrees, the first polarization angle of the first transmission-side strip conductor is −45 degrees, the third polarization angle of the first reception-side strip conductor is +45 degrees, and the second polarization angle of the second transmission-side strip conductor and the fourth polarization angle of the second reception-side strip conductor are horizontal angles.

9. The radar device of claim 6, wherein the transmission polarization angle of the transmission antenna is −45 degrees, the reception polarization angle of the reception antenna is +45 degrees, the first polarization angle of the first transmission-side strip conductor is +45 degrees, the third polarization angle of the first reception-side strip conductor is −45 degrees, and the second polarization angle of the second transmission-side strip conductor and the fourth polarization angle of the second reception-side strip conductor are vertical angles.

10. The radar device of claim 6, wherein the transmission polarization angle of the transmission antenna is a vertical angle, the reception polarization angle of the reception antenna is a horizontal angle, the first polarization angle of the first transmission-side strip conductor is a horizontal angle, the third polarization angle of the first reception-side strip conductor is a vertical angle, and the second polarization angle of the second transmission-side strip conductor and the fourth polarization angle of the second reception-side strip conductor are +45 degrees.

11. The radar device of claim 6, wherein the transmission polarization angle of the transmission antenna is a horizontal angle, the reception polarization angle of the reception antenna is a vertical angle, the first polarization angle of the first transmission-side strip conductor is a vertical angle, the third polarization angle of the first reception-side strip conductor is a horizontal angle, and the second polarization angle of each of the second transmission-side strip conductor and the second reception-side strip conductor is −45 degrees.

12. The radar device of claim 1, wherein a signal directed from the upper cover toward the transmission antenna is not transmitted to the transmission antenna, a signal directed from the upper cover toward the reception antenna is not transmitted to the reception antenna, and a signal reflected from the transmission antenna or the reception antenna and directed toward the upper cover is not transmitted through the upper cover.

13. A radar detection method comprising:

transmitting a transmission polarization signal having a predetermined transmission polarization angle so that at least one transmission antenna detects an object; and radiating the transmission polarization signal to an outside via a transmission-side strip conductor and a transmission-side ferromagnetic material and through an upper cover, wherein a polarization angle of the signal radiated to the outside through the upper cover is different from a transmission polarization angle of the transmission polarization signal transmitted from the transmission antenna.

14. The radar detection method of claim 13, further comprising:

causing an external signal to enter an inside through the upper cover; and receiving, by the at least one reception antenna, the signal that enters the inside through the upper cover, wherein the polarization angle of the signal that enters the inside through the upper cover is different from the reception polarization angle of the reception polarization signal, which is a signal that reaches the at least one reception antenna.

15. The radar detection method of claim 14, wherein the transmission polarization angle of the transmission antenna and the reception polarization angle of the reception antenna are different from each other by 90 degrees.

* * * * *